United States Patent
Branan, Jr. et al.

[11] Patent Number: 6,156,837
[45] Date of Patent: *Dec. 5, 2000

[54] CARBON BLACKS

[75] Inventors: John M. Branan, Jr., Amarillo, Tex.; Bin Chung, Nashua, N.H.; Frank J. Hrach, Jr., Parkersberg, W. Va.; Ronald C. Hurst; David J. Kaul, both of Pampa, Tex.; Sergio A. Montes, Nashua, N.H.; William L. Sifleet, Acton, Mass.; Daniel W. Weaver, Amarillo; Jay Zimmer, Pampa, both of Tex.

[73] Assignee: Cabot Corporation, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/109,973

[22] Filed: Aug. 23, 1993

Related U.S. Application Data

[62] Division of application No. 07/846,644, Mar. 5, 1992, abandoned.

[51] Int. Cl.[7] .................................................. C09C 1/48
[52] U.S. Cl. ......................................... 524/495; 423/449.1
[58] Field of Search ................................. 106/472, 476; 524/495; 423/449.1

[56] References Cited

U.S. PATENT DOCUMENTS

| | | |
|---|---|---|
| 2,779,664 | 1/1957 | Sweitzer . |
| 3,401,020 | 9/1968 | Kester et al. . |
| 3,438,732 | 4/1969 | Morel . |
| 3,523,812 | 8/1970 | Kraus et al. . |
| 4,075,156 | 2/1978 | Johnson ............................... 423/449.1 |
| 4,105,750 | 8/1978 | Horn et al. . |
| 4,755,371 | 7/1988 | Dickerson . |
| 4,909,960 | 3/1990 | Watanabe et al. ....................... 524/495 |
| 5,236,992 | 8/1993 | Bush ..................................... 423/449.1 |

FOREIGN PATENT DOCUMENTS

| | | |
|---|---|---|
| 1815463 | 9/1969 | Germany . |
| 2842977 | 4/1980 | Germany . |
| 687867 | 2/1953 | United Kingdom . |
| 1244879 | 9/1971 | United Kingdom . |
| PCT/US93/1972 | 3/1993 | WIPO . |

OTHER PUBLICATIONS

Abstract, RE28,974 Morgan, et al., Sep. 21, 1976.
Abstract, 2,785,964 Lyle W. Pollock, Mar. 19, 1957.
Abstract, 3,922,335 Jordan, et al., Nov. 25, 1975.
Abstract, 3,607,058 Middlebrooks, et al, Sep. 21, 1971.
Abstract, 3,887,690 Crull, et al, Jun. 3, 1975.
Abstract, 3,761,577, Crull, et al, Sep. 25, 1973.

*Primary Examiner*—Steven P. Griffin
*Assistant Examiner*—Stuart L. Hendrickson

[57] ABSTRACT

A process for producing carbon blacks comprised of mixing an oxidant, primary fuel, and carbon black feedstock to form carbon black particles and aggregates, passing the mixture through a reactor, cooling, separating, and recovering the carbon black product. The improvement comprises the addition of a secondary oxidant-containing stream to the reactor such that the secondary oxidant stream does not interfere with the formation of the carbon black particles and aggregates in the reactor. Also disclosed are new carbon black products defined by the following parameters:

35 mg/g $\leq I_2$ No. $\leq$ 65 mg/g 30 m$^2$g $\leq$ CTAB $\leq$ 55 m$^2$g 1.12 mg/m$^2 \leq I_2$ No./CTAB ratio Tint $\leq$ 65%

75 cc/100 g $\leq$ CDBP $\leq$ 95 cc/100 g

Also disclosed are rubber and/or plastic compositions containing the new carbon blacks.

10 Claims, 1 Drawing Sheet

CARBON BLACKS

This is a division of application Ser. No. 07/846,644 filed Mar. 5, 1992 now abandoned.

FIELD OF INVENTION

The present invention relates to a new process for producing furnace carbon blacks and a class of new and novel furnace carbon blacks which are suitable for various applications and particularly well suited for use in rubber or plastic compositions.

BACKGROUND

Carbon blacks are generally produced in a furnace-type reactor by pyrolyzing a hydrocarbon feedstock with hot combustion gases to produce combustion products containing particulate carbon black. A variety of methods for producing carbon blacks are generally known.

In one type of a furnace carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences. In this instance, pyrolysis refers to the thermal decomposition of a hydrocarbon. The resulting combustion gas mixture, in which pyrolysis is occurring, then passes into a reaction zone where completion of the carbon black forming reactions occurs.

In another type of furnace black reactor, a liquid or gaseous fuel is reacted with an oxidant, preferably air, in the first zone to form hot combustion gases. These hot combustion gases pass from the first zone, downstream though the reactor, into a reaction zone and beyond. To produce carbon black, a hydrocarbonaceous feedstock is injected at one or more points into the path of the hot combustion gas stream. The hydrocarbonaceous feedstock may be liquid, gas or vapor, and may be the same or different from the fuel utilized to form the combustion gas stream. Generally the hydrocarbonaceous feedstock is a hydrocarbon oil or natural gas. However, other hydrocarbonaceous feedstocks such as acetylene are known in the art. The first (or combustion) zone and the reaction zone may be divided by a choke, or zone of restricted diameter, which is smaller in cross section than the combustion zone or the reaction zone. The feedstock may be injected into the path of the hot combustion gases upstream of, downstream of, and/or in the restricted diameter zone. Furnace carbon black reactors of this type are generally described in U.S. Pat. Reissue No. 28,974 and U.S. Pat. No. 3,922,355.

In both types of processes and reactors described above, and in other generally known reactors and processes, the hot combustion gases are at a temperature sufficient to effect pyrolysis of the hydrocarbonaceous feedstock injected into the combustion gas stream. In one type of reactor, such as disclosed in Kester, feedstock is injected, at one or more points, into the same zone where combustion gases are being formed. In other type reactors or processes the injection of the feedstock occurs, at one or more points, after the combustion gas stream has been formed.

In either type of reactor, following the point of feedstock introduction, the feedstock is mixed, atomized and vaporized into the combustion gas stream. The mixture of combustion gases and vaporized feedstock then enters the primary reaction zone. The term, "primary reaction zone", refers to that zone in the process where the vaporized hydrocarbon feedstock is converted to carbon black primary particles and aggregates. The residence time of the feedstock, combustion gases, and carbon blacks in the primary reaction zone of the reactor is sufficient, and under conditions suitable, to allow the formation of carbon blacks. A secondary reaction zone may or may not exist in the reactor downstream of the primary reaction zone. In those cases where the secondary reaction zone exists, the term "secondary reaction zone" refers to that portion of the reactor where surface modification of the carbon blacks formed in the primary reaction zone takes place. The mixture of combustion gases and carbon blacks in the secondary reaction zone of the reactor is hereinafter referred to, throughout the application, as "the effluent". After carbon blacks having the desired properties are formed, the temperature of the effluent is lowered to stop the major reactions. This lowering of temperature of the effluent to stop the major reactions may be accomplished by any known manner, such as by injecting a quenching fluid, through a quench, into the effluent. As is generally known to those of ordinary skill in the art, the major reactions are stopped when the desired carbon blacks have been produced in the reactor, as is determined by sampling the carbon black and testing for analytical properties. After the reactions have been stopped and the effluent sufficiently cooled by any known means, the effluent generally passes through a bag filter, or other separation system to collect the carbon black.

Although two general types of furnace carbon black reactors and processes have been described, it should be understood that the present invention can be used in any other furnace carbon black reactor or process in which carbon black is produced by pyrolysis and/or incomplete combustion of hydrocarbons. This process differs from prior technology in that an oxidant-containing stream is introduced into the secondary reaction zone in order to accelerate and promote surface modifying reactions in the secondary reaction zone only. Throughout this application, the term "oxidant-containing stream" refers to any stream which contains an oxidizing agent. Preferably, 'oxidant-containing stream' refers to air, oxygen-enriched air, combustion products of hydrocarbon fuels and air and/or oxygen, or mixtures of these streams. This oxidant-containing stream does not interfere with reactions or processes occurring in the primary reaction zone in which the carbon black primary particles and aggregates are formed.

In the prior art, there are references such as U.S. Pat. Nos. 3,607,058; 3,761,577; and 3,887,690 which describe the introduction of secondary heat into a carbon black reactor. These references differ from the present invention in that a minimum residence time, determined by the temperature increase of the effluent after addition of an oxidant-containing stream to the secondary reaction zone, is required to achieve the benefits of the present invention. No residence time or minimum temperature rise after addition of secondary heat is specified in the prior art references. From the examples cited in U.S. Pat. No. 3,887,690, the analytical properties of the carbon blacks, particularly the fact that the Nitrogen Surface Area is greater than the Iodine Adsorption Number in all cases, indicate that the minimum residence time requirement of the present invention has not been achieved.

Carbon blacks may be utilized as pigments, fillers, reinforcing agents and for a variety of other applications. Carbon blacks are widely utilized as fillers and reinforcing pigments in the compounding and preparation of rubber compositions and plastic compositions. Carbon blacks are generally characterized on the basis of their properties including, but not limited to, their surface areas, surface chemistry, aggregate sizes and particle sizes. The properties of carbon blacks are analytically determined by tests known to the art, including iodine adsorption surface area ($I_2$ No), nitrogen adsorption surface area ($N_2$ SA), dibutyl phthalate adsorption (DBP), dibutyl phthalate adsorption of the crushed carbon black (CDBP), cetyl-trimethyl ammonium bromide absorption value (CTAB), Tint value (TINT), Dmode and $\Delta D50$.

It is generally understood that the properties of a carbon black affect the properties of rubber or plastic compositions containing the carbon black. For example, the introduction of carbon black into a rubber or plastic composition during formation of the composition will generally affect the viscosity of the rubber or plastic composition. Increasing the carbon black loading in a rubber or plastic composition normally increases the viscosity of the composition at a given temperature. Lower viscosity rubber or plastic compositions are advantageous because they are more easily processed.

In addition to a variety of other uses, such as tire, hoses, belts, and plastics, carbon blacks are generally utilized in compositions intended for use as semi-conductive shielding compounds for electric power cables. Electric power cables generally consist of electrically conductive wires surrounded by a dielectric insulating material which prevents escape of electricity to the environment. These semi-conductive shielding compounds are critical for long cable life because they reduce the electrical stress between the conductive and insulating portions of the cable. It is generally desirable in the production of semi-conductive shielding compounds for electrical power cables to use carbon blacks which impart electrical conductivity to the shielding compound. In evaluating the conductivity of a plastic composition, the composition's resistivity is generally measured. However, it is widely understood that conductivity is simply the inverse of resistivity. The required degree of conductivity in the shielding compound can be achieved by increasing the loading of carbon black in the composition, but this also increases the compound viscosity. Therefore, it is apparent that it is advantageous to use a carbon black that imparts the required degree of conductivity while minimizing the compound viscosity. The advantage of optimizing this combination of properties is not limited to semi-conductive shielding materials for power cables.

The ASTM 300% modulus of a rubber compound is a measure of the compound's stress-strain relationship. ASTM Test D3192 describes the evaluation of modulus for a rubber compound. Carbon black specifications are often set based on the ability of the carbon black to impart a range of modulus values to a compound within certain narrow tolerances. It is advantageous to have a process that enables the carbon black producer to manipulate a composition's modulus for a given type of carbon black. Additionally, for certain applications, such as off-the-road automobile tires, a carbon black that imparts low modulus to rubber compounds is considered advantageous.

The Compound Moisture Absorption (CMA) property of a rubber or plastic composition relates to the composition's tendency to absorb moisture. It is generally desirable, for most applications, to have rubber or plastic compositions that do not absorb moisture. Therefore, it is advantageous to have a carbon black that, when incorporated into rubber or plastic compositions, results in a lower CMA for the composition. Lower CMA values are generally understood to relate to lower absorption of moisture.

As will be understood from the foregoing discussion, it would be advantageous to have a process for producing carbon blacks that impart improved conductivity to plastic or rubber compositions. It would be further advantageous to have class of carbon blacks that impart improved conductivity and lower viscosity to plastic or rubber compositions.

It would also be advantageous to have a process for producing carbon blacks that impart lower modulus to rubber compositions, lower CMA to plastic or rubber compositions and lower viscosity to plastic or rubber compositions.

The process of the present invention achieves the aforementioned advantages in addition to other advantages that will become apparent to those of ordinary skill in the art from the following description. Similarly the carbon blacks of the present invention achieve the afore-mentioned advantages and other advantages that will become apparent from the following description.

SUMMARY OF THE INVENTION

We have discovered a process for producing carbon blacks both of a conventional type and others which are novel as described hereinafter, wherein an oxidant-containing stream such as air, oxygen-enriched air, or combustion products of hydrocarbon fuel and air is injected into the reactor in the secondary reaction zone at a point after the primary-reaction zone in order to accelerate the rate of surface modifying reactions in the secondary reaction zone by raising the temperature in the secondary reaction zone without interfering with reactions which normally occur in the primary reaction zone.

The process is suitable for use in any carbon black reactor wherein the temperature of the effluent stream prior to the downstream oxidant-containing stream injection is greater than 1800° F. and less than 2700° F. The location of the downstream oxidant-containing stream injection is at any point downstream of the primary reaction zone and upstream of the quench which terminates reactions in the effluent. The amount of oxidant stream addition is sufficient to raise the reactor effluent temperature by a minimum amount, $\Delta T_{min}$, depending on residence time, t, after oxidant addition and before quenching, defined by $$\Delta T_{min} = 1598° \text{ F.} - 6.20 \times (t, ms)$$

where $$\Delta T_{min} \geq 110° \text{ F.}$$

and $$t \geq 180 \text{ ms.}$$

We have also discovered a new class of carbon blacks having an iodine adsorption number ($I_2$ No) of 35 mg/g (milligrams per gram) to 65 mg/g; a CTAB of 30 $m^2$/g to 55 $m^2$/g; and $I_2$ No/CTAB ratio of at least 1.12 mg/$m^2$, preferably between 1.12 and 2.20 mg/$m^2$, and more preferably between 1.12 and 1.50 mg/$m^2$; a CDBP (crushed dibutyl phthalate absorption) of 75 cc/100 g (cubic centimeters dibutyl phthalate per 100 grams carbon black) to 95 cc/100 g; a tint value (TINT), in %, of not greater than 65%, preferably between 30% and 65%. We have further discovered rubber and plastic compositions in which these carbon blacks are incorporated.

The carbon blacks of the present invention may be produced according to the process of the present invention in a furnace carbon black reactor having a first (combustion)

zone, a feedstock injection zone, and a reaction zone consisting of a primary reaction zone and a secondary reaction zone. In the feedstock injection zone, a carbon black yielding feedstock is injected in any manner known to the art, into a hot combustion gas stream. The resultant mixture of hot combustion gases and feedstock passes first into the primary reaction zone and then into the secondary reaction zone. Reaction is stopped by quenching the mixture when the carbon blacks of the present invention have been formed. Preferably reaction is stopped by a quench injecting a quenching fluid. The process for preparing the novel carbon blacks of the present invention will be described in greater detail hereinafter.

The rubbers for which the novel carbon blacks of this invention are effective as reinforcing agents include any natural and synthetic rubbers. Generally, amounts of the carbon black product ranging from about 10 to about 250 parts by weight can be used for each 100 parts by weight of rubber. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene, polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2vinylpyridine, 5-ethyl-2-vinylpyridine, 2-methyl-5-vinylpyridine, alkyl substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylene-propylene polymers which additionally contain a third monomer such as dicyclopentadiene, 1, 4-hexadiene and methylene norbornene.

Any plastic is suitable for use with the present invention. Among the plastics suitable for use with the novel carbon blacks of this invention are polyethylene, including very low density, high density, and linear low density. Also included are copolymers such as ethylene ethyl acrylate, ethylene vinyl acetate, and ethylene butyl acrylate. Compositions made from blends of elastomers and plastics, both described above, are also suitable for use.

It is an advantage that the novel carbon blacks of the present invention impart, at a given resistivity, lower viscosity to plastic and rubber compositions than conventional comparable carbon blacks.

It is a further advantage that the process of the present invention produces carbon blacks which impart, at a given resistivity, lower viscosity to plastic and rubber compositions.

Another advantage is that the process of the present invention produces carbon blacks that impart lower modulus to rubber compositions at a given carbon black loading.

It is a further advantage that the process of the present invention may be utilized to produce carbon blacks that impart lower CMA (compound moisture adsorption) to rubber and plastic compositions.

It is an advantage that the plastic compositions of the present invention are particularly well suited for use as electric cable semi-conductive sheathing, with improved conductivity and processability characteristics.

Other advantages of the present invention will become apparent from the following more detailed description of the invention.

DETAILED DESCRIPTION OF THE INVENTION

Figure 1:
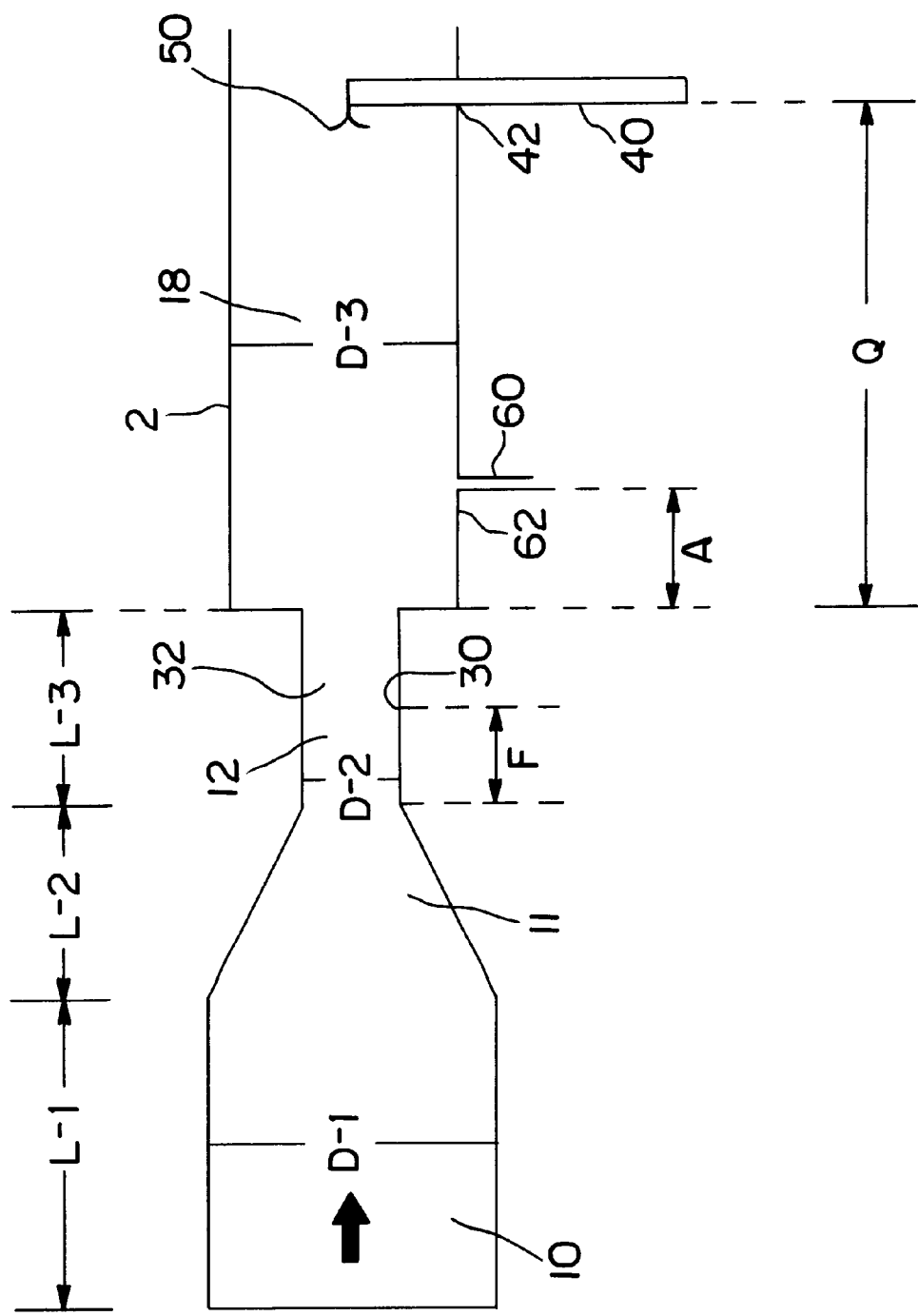
FIG. 1 is a cross-sectional view of a portion of one type of furnace carbon black reactor which may be utilized in the process of the present invention and to produce the carbon blacks of the present invention. This carbon black reactor is used in the examples, but is only typical of the reactors which may be used.

According to the process of the present invention, air, oxygen-enriched air, combustion products of hydrocarbons and air and/or oxygen, or any other oxidant-containing stream is injected in any manner known to the art, into the carbon black containing effluent stream. The effluent stream being at a temperature of between 1800° F. and 2700° F. prior to oxidant-containing stream injection, into the secondary reaction zone of a reactor vessel at a point downstream of the primary reaction zone in an amount sufficient to raise the temperature of the effluent stream by a minimum amount, depending on the residence time after oxidant addition and before quenching, defined by:

$$\Delta T_{min} = 1598° \text{ F.} - 6.20 \times (t, ms)$$

where $$t \geq 180 \text{ ms}$$

and $$\Delta T_{min} \geq 110° \text{ F.}$$

The maximum allowable temperature rise is limited by the melting temperature of the carbon black reactor materials. The maximum residence time is limited by the size of the carbon black reactor.

As will be understood by those of ordinary skill in the art, the point of initial feedstock injection is the point where carbon black formation begins. The primary reaction zone refers to that portion of the carbon black reactor where the hydrocarbon feedstock and combustion gases are undergoing the major carbon forming reactions to form carbon black primary particles and aggregates. This primary reaction zone may be further defined as the portion of the reactor downstream of the point of feedstock injection and upstream of the point where the expanding jet of combustion gases, feedstock, and carbon black, issuing from the orifice linking the first-stage combustion chamber with the carbon black reactor, first contacts the wall of the carbon black reactor. For the carbon black reactor depicted in FIG. 1, this primary reaction zone (sometimes referred to as the "recirculation zone") may be further defined as extending from the entrance to the carbon black furnace to a point approximately 3.8×Furnace Diameters downstream into the primary combustion zone, based on an average expansion angle of 15° for the expanding jet of combustion gases, feedstock, and carbon black. These process definitions will be demonstrated by example. These examples, however, do not necessarily define the limits of this invention.

The oxidant-containing stream may be injected in any manner known to those of ordinary skill in the art. For example, the oxidant-containing stream may be injected by attaching a conduit to a port through the walls of the reactor leading to the secondary reaction zone in the carbon black reactor and injecting the stream through the port. In addition, the downstream oxidant-containing stream may be injected by any means known to the art. The process for producing carbon blacks of the present invention is suitable for use in any carbon black reactor wherein the temperature of the reactor effluent stream prior to downstream oxidant-containing stream addition is less than 2700° F. and greater than 1800° F. Further, the oxidant-containing stream is injected in an amount sufficient to raise the effluent temperature, by heat of reaction and/or by sensible heat addition, by a minimum amount, depending on the residence time in the reactor after oxidant addition and before quenching, defined by:

$$\Delta T_{min} = 1598° \text{ F.} - 6.20 \times (t, ms)$$

where $$t \geq 180 \text{ ms}$$

and $$\Delta T_{min} \geq 110° \text{ F.}$$

A cross-sectional view of a type of reactor in which the process of the present invention may be practiced is depicted in FIG. 1. As will be understood, the process of the present invention does not require any modification of the carbon black reactor, other than the provision of a means for injecting the oxidant-containing stream, and therefore may be practiced in other types of carbon black reactors, such as the types generally discussed in the Background section.

FIG. 1 depicts, in cross-sectional view, a modular, also referred to as a "staged", furnace carbon black reactor of the type generally disclosed in U.S. Pat. No. 3,922,335, the disclosure of which is hereby incorporated by reference. FIG. 1 illustrates a furnace carbon black reactor 2, having a first-stage combustion zone 10, which has a zone of converging diameter 11; feedstock injection zone 12; and reaction zone 18. The diameter of the combustion zone, 10, up to the point where the zone of converging diameter, 11, begins is shown as D-1; the diameter of zone 12, as D-2; and the diameter of zone 18 as D-3. The length of the first-stage combustion zone, 10, up to the point where the zone of converging diameter, 11, begins is shown as L-1; the length of the zone of converging diameter is shown as L-2; and the length of the feedstock injection zone is shown as L-3.

To produce carbon blacks, hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone, 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having high content of carbon-containing components and in particular, hydrocarbons. The ratio of air to fuel varies with type of fuel utilized. When natural gas is utilized to produce the carbon blacks of the present invention, the ratio of air to fuel may be from about 10:1 to about 100:1. To facilitate the generation of hot combustion gases, the oxidant stream may be preheated.

The hot combustion gas stream flows downstream from zones 10 and 11 into zones 12 and then 18. The direction of the flow of hot combustion gases is shown by the arrow in FIG. 1. Carbon black-yielding feedstock, 30, is introduced at point 32. The distance from the end of the zone of converging diameter, 11, downstream to point 32 is shown as F. In the examples described herein, carbon black-yielding feedstock, 30, was injected through a plurality of jets which penetrate into the interior regions of the hot combustion gas stream to insure a high rate of mixing and shearing of the hot combustion gases and the carbon black-yielding feedstock so as to rapidly and completely decompose and convert the feedstock to carbon black particles and aggregates.

Suitable for use herein as carbon black-yielding hydrocarbon feedstocks, which are readily volatilizable under the conditions in the reactor, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The mixture of carbon black-yielding feedstock and hot combustion gases flows downstream through zone 12 into the carbon black reactor, zone 18. The carbon black reactor, zone 18, may generally be divided into two zones in the present invention: the primary reaction zone and the secondary reaction zone. The primary reaction zone extends from the outlet of zone 12 to approximately 3.8 reactor diameters downstream in zone 18 (3.8 times D-3). Air or other oxidant-containing stream is injected into the effluent at point 62 through line 60. The axial distance between the beginning of zone 18 and downstream to point 62 is shown as A and shall be at least 3.8×(D-3) in a reactor of the configuration shown in FIG. 1 in order to reap the benefits of this invention. In order for the oxidant-containing stream to penetrate the effluent, the oxidant-containing stream is injected at a pressure above the pressure of the effluent. The oxidant-containing stream may be injected through a nozzle, or simply through an open orifice.

Quench 40, located at point 42, injecting quenching fluid 50, is utilized to stop the reactions in the effluent. According to the process of the present invention, quench 40, is located at a position 42 which allows at least the minimum residence time, previously defined, after the injection of the oxidant-containing stream at point 62 though line 60. Q is the distance from the beginning of zone 18 to quench point 42, and will vary according to the position of the quench.

After the mixture of hot combustion gases and carbon black-yielding feedstock is quenched, the cooled gases pass downstream into any conventional cooling and separating devices whereby the carbon blacks are recovered. The separation of the carbon black from the gas stream is readily accomplished by conventional means such as a precipitator, cyclone separator or bag filter. This may be, but is not necessarily, followed by some means of densification, such as pelletization and drying.

The novel carbon blacks of the present invention are bounded by the following properties:

35 mg/g$\leq$I$_2$ No.$\leq$65 mg/g 30 m$^2$/g$\leq$CTAB$\leq$55 m$^2$/g 1.12 mg/m$^2$$\leq$I$_2$ No./CTAB ratio Tint≦65%

75 cc/100 g≦CDBP≦95 cc/100 g

In a preferred embodiment of this invention, the $I_2$ Number/CTAB ratio range is from 1.12 to 2.20 mg/m², and more preferably is from 1.12 to 1.50 mg/m². It is preferred that the TINT range from 35% to 65%. We have further discovered novel rubber and plastic compositions in which these carbon blacks are incorporated.

The following testing procedures are used in the determination and evaluation of the analytical properties of the carbon blacks of the present invention, and the physical properties of the rubber compositions incorporating the carbon blacks of the present invention.

CTAB of the carbon blacks was determined according to ASTM Test Procedure D3765-85. Iodine number ($I_2$ No.) of the carbon blacks was determined according to ASTM Test Procedure D1510. Tinting strength (Tint) of the carbon blacks was determined according to ASTM Test Procedure D3265-85a. The CDBP (Crushed Dibutyl Phthalate) of the carbon black pellets was determined according to the procedure set forth in ASTM D3493-86.

The rubber and plastic compositions in the following examples were evaluated according to the following test procedures. The viscosity of the compositions was determined according to ASTM D3835-79. The modulus, tensile and elongation of the rubber compositions were measured by the procedure set forth in ASTM D412. The Melt Flow Index, MFI, of the compositions was determined by ASTM D1238-89. The polymer that was used in these examples was ethylene ethyl acrylate (EEA) having a MFI of 6 g/10 min and a density of 0.931 g/cm³. The compositions consisted of carbon black and EEA only.

The volume resistivity of the compositions was determined in the following manner. The volume resistivity (VR) of a specimen is the product of its electrical resistance (R) and its cross sectional area (A) divided by its effective length (L) as shown by the following equation:

$$VR = R \times A/L$$

The electrical resistance was determined as follows. A coupon having a length of 6 inches and a width of 1.5 inches is cut from an extruded tape. Two coupons are needed for each compound and they are cut from the tape so that the length is in the direction of extrusion. Apply a half inch wide strip of a silver paint, (in this instance DAG#416 from Acheson Dispersions, Port Huron Mich., was used) to both sides of the end of the coupon. Cover the top, the bottom, and the edges of the coupon within the half inch dimension. After the paint has dried, measure the compounds width, thickness, and the distance between the painted areas using appropriate gauges. Place the coupons across one 5 inch by 16 inch polycarbonate sheet so that the painted ends are off the polycarbonate sheet. Arrange three coupons so that they are separated at least 0.25 inches from each other. Place another polycarbonate sheet of the same dimensions on top of the coupons. Secure both polycarbonate sheets using appropriate fasteners. Place 0.25 inch by 0.5 inch brass shims over the painted areas on the top and bottom of the exposed coupon ends. Attach appropriate clips on the end of wires to the brass shims. A digital multimeter, (in this case a Digitec H10-2120 from United Systems Corp., Dayton, Ohio, was used) should be used to determine the electrical resistance. The electrical resistance has units of ohms while A and L have units of square centimeters (cm²) and centimeters (cm), respectively. Therefore, the volume resistivity has units of ohms-cm.

The Compound Moisture Adsorption (CMA) of the compositions was determined according to the following procedure. A previously dried compound sample is placed in a cabinet that maintains an atmosphere of a constant humidity level for a predetermined period of time. After this period, the moisture absorption is calculated from the relative weight gain of the composition. The details of the procedure are as follows. A sample of 25 grams of compound is granulated using a grinder with a 4 millimeter screen. From this product a sample of 2 grams is dried at 140° F. under 10 inches of vacuum for a minimum of 2 hours and a maximum of 16 hrs. A humidity cabinet (such as Blue M Model FR-251B-1 or equivalent) is set to a temperature of 80° F. and 87 percent relative humidity. After drying, the samples are placed in the humidity cabinet for a period of seven days, after which the weight gain is determined by means of an appropriately accurate balance. The CMA value is expressed as the moisture absorption at 80° F. and 87 percent relative humidity for seven days relative to the original weight.

The effectiveness and advantages of the present invention will be further illustrated by the following examples.

EXAMPLES

To demonstrate the effectiveness of the present invention and the advantages of the new products resulting from this invention, experiments were conducted in a carbon black producing process in a reactor substantially described herein, and as depicted in FIG. 1 with the geometry set forth. In all examples, the primary fuel for the combustion reaction was natural gas supplied to the carbon black forming process at about ambient temperature of approximately 298 K (77° F.). The liquid feedstocks utilized in all examples were commercially available hydrocarbon mixtures having properties listed in Table 1.

TABLE 1

| Properties of Liquid Hydrocarbon Feedstock | | | | |
|---|---|---|---|---|
| Feedstock Type | A | B | C | D |
| H/C Ratio | 0.94 | 0.94 | 1.03 | 0.97 |
| Hydrogen (Wt %) | 7.20 | 7.30 | 8.00 | 7.51 |
| Carbon (Wt %) | 91.6 | 92.5 | 92.4 | 92.4 |
| API Gravity - 288.6/288.6K | -2.7 | 3.3 | 10.4 | 5.4 |
| BMCI (Visc-Grav) | 143 | 132 | 85 | 118 |

Examples 1–7

Examples 1–7 in Table 2 illustrate the effect of oxidant addition location on carbon black product properties. In Examples 1, 2, and 3, combustion air at a rate of 50 KSCFH and natural gas at a rate of 2.06 KSCFH were combusted in the first-stage combustion zone and feedstock was injected at point 32 at a rate of 130 gallons per hour. These conditions were held approximately constant for each of these examples and in each case the effluent was quenched at a distance of 46 feet downstream of the point of oil injection. Example 1 was a control run in which no downstream oxidant was added to the effluent. The resulting carbon black of Example 1 had an Iodine number of 31.7 mg/g, a CTAB of 30.1 m²/g, a Tint of 39.4%, and an Iodine Number/CTAB ratio of 1.05 mg/m². In Example 2, air preheated to 750° F. was added to the effluent through port 60 at a rate of 28.6 KSCFH at a point 8 feet downstream of the reactor inlet. This distance is equivalent to 2.7 reactor diameters, which is within the primary reaction zone which was previously described, and is not within the criteria of this invention. The carbon black product of Example 2 had an Iodine number of 53.9 mg/g, CTAB of 43.3 m²/g, Tint of 61.5%, and a CDBP of 68.4 cc/100 g. The relatively large increase in Tint (56%) and CTAB (44%), along with the large drop in CDBP, as compared to Example 1, indicate that the downstream oxidant addition has interfered with the major carbon black particle and aggregate forming reactions which normally occur in the primary reaction zone of the carbon black furnace. The addition of an oxidant-containing stream under the conditions of this invention does not affect or interfere with the formation of carbon black particles and aggregates which normally occurs in the primary reaction zone.

In Example 3, a downstream oxidant stream composed of air was injected into the reactor effluent at a rate of 28.6 KSCFH at a distance 22.5 feet (7.5 reactor diameters) downstream of the reactor inlet, which was clearly in the previously defined secondary reaction zone, downstream of the primary reaction zone in the carbon black reactor of FIG. 1. The carbon black of Example 3 had an Iodine Number/CTAB ratio of 1.21 mg/m² and a CDBP of 82.8 cc/100 g, both of which are characteristic of the new class of products. Also, the Tint and CTAB of Example 3 are only slightly different (6% and 7%, respectively) than those of Example 1, indicating that the downstream oxidant addition in this case has not interfered with reactions in the primary reaction zone in which carbon black primary particles and aggregates are formed. The major effect of the downstream oxidant-stream addition in Example 3 has been to raise the Iodine Number/CTAB ratio and accelerate the reactions typical of the secondary reaction zone in the carbon black reactor.

In Examples 4 and 5, the first-stage combustion air rate was 50 KSCFH and the first-stage gas rate was 2.06 KSCFH. Feedstock was injected at point 32 at a rate of 130 gph, and the reactions were stopped by quenching with water at 28 feet downstream from the reactor inlet. In Example 4, no downstream oxidant was added to the reactor, and the resulting carbon black had an Iodine number of 31.3 mg/g, a CTAB of 31.2 m²/g, an Iodine Number/CTAB ratio of 1.00 mg/m², and a Tint of 40.3%. In Example 5, air preheated to 750° F. was used as the downstream oxidant and was added to the reactor at a rate of 28.6 KSCFH position 14.5 feet downstream of the reactor inlet, which is equivalent to 4.8 reactor diameters downstream of the reactor inlet and downstream of the primary reaction zone, as previously defined for the reactor depicted in FIG. 1. The resulting carbon black of Example 5 had an Iodine number of 42.2 mg/g and a CTAB of 34.7 m²/g, for an Iodine number/CTAB ratio of 1.22 mg/m², and a Tint of 43.5%. Comparing Examples 4 and 5 shows that the Iodine number/CTAB ratio has been significantly increased by adding downstream oxidant at 4.8 reactor diameters downstream, but the CTAB and Tint have been changed only slightly (11% and 8%, respectively). Therefore, the carbon particle and aggregate forming reactions occurring in the primary reaction zone have not been affected by adding preheated air to the reactor at a position 4.8 reactor diameters downstream of the reactor inlet.

Examples 6 and 7 show that oxidant may be added at 4.0 reactor diameters downstream of the reactor inlet without substantially altering the carbon black particle and aggregate forming reactions which are occurring in the primary reaction zone. In Example 6 and 7, combustion air at a rate of 35 KSCFH and natural gas at a rate of 1.66 KSCFH were supplied to the first-stage combustion chamber. Feedstock was injected at point 32 in both examples, at a rate of 84 gph in Example 6 and 94 gph in Example 7. The difference in feedstock rate was necessary to account for slight differences in feedstock properties and provide roughly equivalent overall combustion levels, and thus equivalent reaction conditions, in the primary reaction zone for each example. In Example 6, no downstream oxidant-containing stream was added to the reactor and the resulting carbon black had an Iodine number of 42 mg/g, a CTAB of 40.3 m²/g, an Iodine number/CTAB ratio of 1.04 mg/m², and Tint of 53%. In Example 7, the combustion products of 20 KSCFH air and 1.09 KSCFH natural gas were used as the downstream oxidant and were added to the reactor at 12 feet downstream of the reactor inlet, which is equivalent to 4.0 reactor diameters downstream of the reactor inlet. Comparing the analytical properties of Examples 6 and 7 shows that Example 7 has significantly higher Iodine number and Iodine number/CTAB ratio, but CTAB and Tint are only slightly higher than for Example 6 (12% and 4%, respectively). This indicates that addition of the combustion products at 4.0 reactor diameters does not interfere with the carbon black particle and aggregate forming reactions of the primary reaction zone.

Examples 8 and 9

Examples 8 and 9 in Table 2 demonstrate that an oxidant-containing stream composed of either air or the combustion products of air and natural gas may be added to the reactor effluent, in the manner of this invention, with the same beneficial results on the carbon black products. In Example 8 and 9, primary combustion air at a rate of 35 KSCFH and natural gas at a rate of 0.92 KSCFH were added to the first-stage combustion chamber, and feedstock was added at point 32 at a rate of 82 gph. In Example 8, a downstream oxidant-containing stream composed of air at a rate of 17 KSCFH was added to the reactor effluent 13.5 feet downstream of the point of oil injection. A carbon black having an Iodine number of 59 mg/g, a CTAB of 41.7 m²/g, a DBPA of 135 cc/100 g was produced. In Example 9, combustion products of 20 KSCFH air and 1.01 KSCFH natural gas, resulting in 100% excess air above the stoichiometric amount, were added to the reactor effluent 13.5 feet downstream of the point of oil injection. The carbon black of Example 9 had analytical properties essentially identical to those of Example 8. Further, the compound performance properties of 90° C. Tape Resistivity, MFI, and CMA % for the carbon blacks of Examples 8 and 9, when compounded in EEA at 38% loading, were essentially identical. The carbon blacks and compounds of Examples 8 and 9 are further examples of the novel products of the present invention.

Examples 10–11

Examples 10 and 11 in Table 2 demonstrate that an oxidant-containing stream composed of either combustion products of air and natural gas or an air stream enriched with oxygen may be added downstream in the carbon black reactor to achieve the desired effects of this invention. In example 10, the combustion products of 31 KSCFH air and 1.74 KSCFH natural gas are added to the reactor through a port located 12 feet downstream from the reactor inlet to produce a carbon black with Iodine number of 58 mg/g and CTAB of 46 m²/g, for an Iodine number/CTAB ratio of 1.23 mg/m². In Example 11, a gas stream comprised of 7.5 KSCFH air mixed with 1.5 KSCFH oxygen, resulting in 34% $O_2$, is added to the reactor via a probe inserted through a port in the reactor walls into the secondary reaction zone of the carbon black reactor at a distance 30 feet downstream of the reactor inlet. Table 2 shows that the analytical properties of the products of Examples 10 and 11 are very similar and fulfill the requirements for the improved products of this invention.

TABLE 2

| | EXAMPLE # | | | | | | | | | | |
|---|---|---|---|---|---|---|---|---|---|---|---|
| | 1 | 2 | 3 | 4 | 5 | 6 | 7 | 8 | 9 | 10 | 11 |
| D-1, in | 7.25 | 7.25 | 7.25 | 7.25 | 7.25 | 7.25 | 7.25 | 7.25 | 7.25 | 7.25 | 7.25 |
| D-2, in | 4.2 | 4.2 | 4.2 | 4.2 | 4.2 | 4.2 | 4.2 | 4.2 | 4.2 | 6.3 | 4.2 |
| D-3, in | 36 | 36 | 36 | 36 | 36 | 36 | 36 | 36 | 36 | 27 | 36 |
| L-1, in | 24 | 24 | 24 | 24 | 24 | 24 | 24 | 24 | 24 | 24 | 24 |
| L-2, in | 12 | 12 | 12 | 12 | 12 | 12 | 12 | 12 | 12 | 12 | 12 |
| L-3, in | 9 | 9 | 9 | 9 | 9 | 9 | 9 | 9 | 9 | 9 | 9 |
| F, in | 4.5 | 4.5 | 4.5 | 4.5 | 4.5 | 4.5 | 4.5 | 4.5 | 4.5 | 4.5 | 4.5 |
| A, ft | na | 8 | 22.5 | NA | 14.5 | NA | 12 | 13.5 | 13.5 | 12 | 13.5 |
| Q, ft | 46 | 46 | 46 | 28 | 28 | 46 | 46 | 46 | 46 | 28 | 46 |
| Oil Inj Pt. | 32 | 32 | 32 | 32 | 32 | 32 | 32 | 32 | 32 | 32 | 32 |
| Tips # × Size, in | 9 × .036 | 9 × .036 | 9 × .036 | 9 × .036 | 9 × .036 | 9 × .036 | 9 × .036 | 9 × .036 | 9 × .036 | 9 × .055 | 9 × .032 |
| Feedstock Rate, gph | 130 | 130 | 130 | 130 | 130 | 84 | 84 | 82 | 82 | 149 | 112 |
| Feedstock Temp., F. | 350 | 350 | 350 | 350 | 350 | 100 | 100 | 200 | 200 | 200 | 200 |
| Feedstock Type | A | A | A | A | A | C | A | D | D | A | C |
| K+ Addition, gm/100 gal oil | 3.1 | 3.1 | 3.1 | 0.85 | 0.85 | 0 | 0 | 0 | 0 | 0.73 | 0 |
| Primary Comb. Air, kscfh | 50 | 50 | 50 | 50 | 50 | 35 | 35 | 35 | 35 | 55 | 55 |
| Primary Comb. Air Temperature, F. | 750 | 750 | 750 | 750 | 750 | 950 | 850 | 750 | 750 | 900 | 900 |
| Primary Nat. Gas, kscfh | 2.06 | 2.06 | 2.06 | 2.06 | 2.06 | 1.7 | 1.49 | 0.92 | 0.92 | 1.51 | 2.6 |
| Air/Gas Burn Ratio | 9.7 | 9.7 | 9.7 | 9.7 | 9.7 | 10.0 | 9.4 | 9.9 | 9.9 | 9.1 | 9.7 |
| Secondary Air Rate, kscfh | 0 | 28.6 | 28.6 | 0 | 28.6 | 0 | 20 | 17 | 20 | 31 | 7.5 |
| Secondary Gas Rate, kscfh | 0 | 0 | 0 | 0 | 0 | 0 | 1.08 | 0 | 1.01 | 1.71 | 0 |
| Secondary Oxygen Rate, kscfh | 0 | 0 | 0 | 0 | 0 | 0 | 0 | 0 | 0 | 0 | 1.5 |
| Zone 2 Temperature Rise, F. | 0 | 430 | 668 | 0 | 668 | 0 | 296 | 477 | 493 | 437 | 377 |
| Zone 2 Residence Time, s | na | 1.03 | 0.52 | na | 0.56 | na | 1.00 | 1.29 | 1.15 | 0.35 | 0.33 |
| Quench Temp, F. | 1350 | 1350 | 1350 | 1350 | 1350 | 1350 | 1350 | 1350 | 1350 | 1350 | 1350 |
| Iodine Number, mg/g | 31.7 | 53.9 | 39.1 | 31.3 | 42.2 | 42 | 54 | 56 | 57 | 58 | 56 |
| CTAB m$^2$/g | 30.1 | 43.3 | 32.2 | 31.2 | 34.7 | 40.3 | 45 | 41 | 42 | 47 | 46 |
| N2 Surface Area | 27.8 | 47.5 | | 29.5 | 36.6 | 38.0 | 48.5 | | 50.5 | 42.0 | 51.9 |
| I2/CTAB Ratio, mg/m$^2$ | 1.05 | 1.24 | 1.21 | 1.00 | 1.22 | 1.04 | 1.2 | 1.36 | 1.35 | 1.23 | 1.22 |
| Tint, % | 39.4 | 61.5 | 41.8 | 40.3 | 43.5 | 53 | 55 | 49 | 49 | 57 | 57 |
| DBPA, cc/100 g | 153.2 | 85.3 | 133.1 | 139 | 133 | 162 | 139 | 135 | 134 | 132 | 160 |
| CDBP, cc/100 g | 76.6 | 68.4 | 82.8 | 78.9 | 76.7 | 89 | 88 | 84 | 84 | 86 | 91 |
| CB LOADING, WT % | | | | | | | | 38.0 | 38.0 | | |
| MELT FLOW INDEX | | | | | | | | 42.2 | 42 | | |
| TAPE RESISTIVITY @ 90 C., OHM-CM | | | | | | | | 13800 | 13500 | | |
| CMA, % NATURAL RUBBER 300X MODULUS, % from IRB-6 | | | | | | | | 0.12 | 0.16 | | |

Examples 12–17

Examples 12–17 in Table 3 illustrate the improved plastic and rubber compound properties which result from using carbon blacks produced by this invention. In these examples, carbon blacks with nearly identical Iodine Number and DBPA were prepared both with and without using downstream oxidant-containing stream addition. The resulting carbon blacks were then compounded in rubber and/or plastic in the manner described previously and the performance of each was evaluated.

Considering first Examples 12 through 15 of Table 3, the natural gas flow rate to the first-stage combustion chamber was 2.0 KSCFH, the primary combustion air flow rate was 50 KSCFH, and the combustion air preheat temperature was 750° F. The resulting primary combustion level is estimated at about 250%. In each of these cases quenching was performed at 28 feet downstream in the reactor. Examples 12 and 14 represent control runs in which carbon blacks having certain Iodine number and structure levels (DBPA) were prepared using the carbon black producing furnace shown in FIG. 1 without any downstream oxidant addition. In examples 12 and 14 there were obtained carbon blacks with 42 mg/g Iodine number, 141 cc/100 g DBPA and 61 mg/g Iodine number, 133 cc/100 g DBPA, respectively. These carbon blacks were compounded in EEA at 44% loading and tested for MFI, Tape Resistivity at 90° C., and CMA %. The results of these tests are listed in Table 3. Examples 13 and 15 represent runs in which carbon blacks having approximately the same Iodine number and structure levels as in Examples 12 and 14 were obtained by using the downstream oxidant addition process of the current invention. In these cases, additional preheated combustion air at a rate of 28.6 KSCFH was added to the carbon black reactor at a distance 14.5 feet downstream of the point of oil injection and the oil feedstock rate was adjusted to give carbon blacks with the desired Iodine number. The resulting carbon blacks of Examples 13 and 15 have nearly the same Iodine number and DBPA as the carbon blacks of Examples 12 and 14, respectively, but the I2 Number/CTAB ratio of the carbon blacks from Examples 13 and 15 are above 1.12 whereas the I2 Number/CTAB ratio of the carbon black from Example 12 is below 1.12 and the TINT of Example 14 is above 65%. The carbon blacks of Examples 13 and 15 were compounded in EEA at 44% loading and tested for Melt Flow Index, Tape Resistivity at 90° C., and CMA %. Referring to Table 3 and comparing the compound performance of Example 13 with Example 12 and that of Example 15 with Example 14, the ratio of Tape Resistivity at 90° C./MFI is much lower for Example 13 than Example 12, and lower for Example 15 than Example 14. A lower value of this ratio indicates that the compound has lower resistivity at a fixed viscosity. Also, the compound of Example 13 has a lower CMA than the compound of Examples 12, and the compound of Example 15 has a lower CMA than the compound of Example 14.

In Example 16, the conditions in the first-stage combustion chamber and rate of feedstock injection at point 32 were essentially identical to those used in Example 12. In Example 16, however, preheated air at a rate of 14.3 KSCFH was added to the reactor effluent 14.5 feet downstream of the point of oil injection. The carbon black product of Example 16 exhibits analytical properties consistent with novel products claimed under this invention. Further, the 300% modulus in Natural Rubber and the 300% modulus in SBR are both lower than the properties of similar rubber compounds produced with conventional carbon black from Example 12. As previously explained, imparting a lower modulus in rubber at a given carbon black loading is a desirable property of carbon black in many applications.

Example 17 is acetylene black, which is not produced by the furnace process, and is shown here as a reference. This material is generally considered one of the best types of carbon black available for use in plastic compositions for medium voltage underground cable sheathing compounds. The Iodine Number, CTAB, TINT, and CDBP all are outside the ranges of the novel products of this invention. Also shown are resistivity and MFI data for acetylene black at two different loadings. Resistivity at 40% loading is nearly identical to Example 15 and resistivity at 38% loading is nearly identical to Example 13. The MFI is much lower for the acetylene black compositions in both cases, indicating that the compositions of Example 17 have higher viscosity at equivalent electrical resistivity than Examples 13 and 15.

TABLE 3

| | EXAMPLE # | | | | | |
|---|---|---|---|---|---|---|
| | 12 | 13 | 14 | 15 | 16 | 17 |
| | | | | | | DENKA ACETYLENE BLACK |
| D-1, in | 7.25 | 7.25 | 7.25 | 7.25 | 7.25 | |
| D-2, in | 4.2 | 4.2 | 4.2 | 4.2 | 4.2 | |
| D-3, in | 36 | 36 | 36 | 36 | 36 | |
| L-1, in | 24 | 24 | 24 | 24 | 24 | |
| L-2, in | 12 | 12 | 12 | 12 | 12 | |
| L-3, in | 9 | 9 | 9 | 9 | 9 | |
| F, in | 4.5 | 4.5 | 4.5 | 4.5 | 4.5 | |
| A, ft | NA | 14.5 | NA | 14.5 | 14.5 | |
| Q, ft | 28 | 28 | 28 | 28 | 28 | |
| Oil Inj Pt. | 32 | 32 | 32 | 32 | 32 | |
| Tips # x Size, in | 9 x .036 | 9 x .036 | 9 x .036 | 9 x .036 | 9 x .036 | |
| Feedstock Rate, gph | 117 | 130 | 104 | 117 | 117 | |
| Feedstock Temp., F. | 350 | 350 | 350 | 350 | 350 | |
| Feedstock Type | A | A | A | A | A | |
| K+ Addition, gm/100 gal oil | 0.85 | 0.85 | 0.85 | 0.85 | 0.85 | |
| Primary Comb. Air, kscfh | 50 | 50 | 50 | 50 | 50 | |
| Primary Comb. Air Temp., F. | 750 | 750 | 750 | 750 | 750 | |
| Primary Nat. Gas, kscfh | 2 | 2 | 2 | 2 | 2 | |
| Air/Gas Burn Ratio | 9.9 | 9.9 | 9.9 | 9.9 | 9.9 | |
| Secondary Air Rate, kscfh | 0 | 28.6 | 0 | 28.6 | 14.3 | |
| Secondary Gas Rate, kscfh | 0 | 0 | 0 | 0 | 0 | |
| Secondary Oxygen Rate, kscfh | 0 | 0 | 0 | 0 | 0 | |
| Zone 2 Temperature Rise, F. | 0 | 580 | 0 | 601 | 361 | |
| Zone 2 Residence Time, s | na | 0.56 | na | 0.55 | 0.69 | |
| Quench Temp, F. | 1350 | 1350 | 1350 | 1350 | 1350 | |
| Iodine Number, mg/g | 42 | 42 | 61 | 63 | 47 | 86 |
| CTAB, $m^2/g$ | 40 | 35 | 54 | 47 | 42 | 75 |
| N2 Surface Area, $m^2/g$ | 37.1 | 36.6 | 52.8 | 54.5 | 41.5 | 67 |
| I2/CTAB Ratio, $mg/m^2$ | 1.05 | 1.2 | 1.13 | 1.34 | 1.12 | 1.15 |
| Tint, % | 48 | 44 | 69 | 57 | 53 | 67 |
| DBPA, cc/100 g | 141 | 133 | 133 | 127 | 135 | 220 |

TABLE 3-continued

| | EXAMPLE # | | | | | |
|---|---|---|---|---|---|---|
| | 12 | 13 | 14 | 15 | 16 | 17 |
| CDBP, cc/100 g | 80 | 77 | 85 | 81 | 79 | 135 |
| CB LOADING, WT % | 44.0 | 44.0 | 44.0 | 44.0 | 40 | 38 |
| MELT FLOW INDEX | 13.9 | 18.5 | 5.7 | 10.7 | 4.0 | 7.7 |
| TAPE RESISTIVITY @ 90 C., OHM-CM | 17298 | 3680 | 2065 | 504 | 443 | 3707 |
| CMA, % | 0.22 | 0.12 | 0.31 | 0.16 | | |
| NATURAL RUBBER 300% MODULUS, % from IRB-6 | +2.8 | | | −1.5 | +0.7 | |

Examples 18–21

Examples 18–21 in Table 4 demonstrate the effect of downstream oxidant stream addition rate on carbon black analytical properties and the reduction in 300% modulus in rubber resulting from compounds made with these carbon blacks. In each of these examples, combustion air at a rate of 50 kscfh and natural gas at a rate of 2.06 kscfh were supplied to the first-stage combustion chamber, and liquid feedstock was injected at a rate of 136 gph at point 32. The only parameter which was varied in these examples was the rate at which preheated air was added to the secondary reaction zone in the carbon black reactor, this air being added to the effluent at a point 14.5 feet downstream of the reactor inlet. In each of these examples, the reactions were stopped by quenching at a point 28 feet downstream of the reactor inlet.

Example 18 was a control run in which no downstream oxidant stream was added to the reactor from which a carbon black having an Iodine number of 24 mg/g, a CTAB of 28 m$^2$/g, and a Tint of 39% was obtained. In Examples 19, 20, and 21, an additional 5, 10 and 20 kscfh air, respectively, was added to the reactor at 14.5 feet downstream of the reactor inlet. In comparing the carbon black analytical properties from these examples, the Iodine number increases as downstream oxidant addition rate is increased. There is essentially very little effect on CTAB surface area or Tint as the downstream oxidant rate is increased, indicating that carbon forming reactions in the primary reaction zone have not been affected by increasing the oxidant stream addition rate. In comparing the 300% modulus in both NR and SBR, expressed as a percentage deviation from a standard sample, for compounds containing the carbon blacks from these examples, the modulus is reduced as the downstream oxidant-containing stream addition rate is increased. As previously described, this capability of reducing the modulus in rubber is an advantage of this process.

Example 19, with a calculated temperature rise of 110° F., exhibits the smallest increase in temperature of any examples which demonstrate the advantages of this invention. Further, the residence time of the effluent in the secondary reaction zone of the reactor after the addition of the downstream oxidant-containing stream is 0.240 seconds (240 milliseconds) in Example 19. In Example 21, the calculated temperature rise is 482° F. and the residence time of the effluent in the secondary reaction zone is 180 ms. It is understood that the chemical reactions of the secondary reaction zone are subject to an increase in reaction rate as temperature increases. It is also understood that the rate of mixing and diffusion of the oxidant stream with the effluent will increase with increasing temperature. Therefore, it is clear that the conditions of Example 19 and 21, having the lowest temperature rise in the secondary reaction zone due to addition of downstream oxidant, and the shortest residence time in the reactor after addition of the secondary oxidant and before quenching (as compared to the other examples), demonstrate the benefits of this invention.

TABLE 4

| | EXAMPLE # | | | |
|---|---|---|---|---|
| | 18 | 19 | 20 | 21 |
| D-1, in | 7.25 | 7.25 | 7.25 | 7.25 |
| D-2, in | 4.2 | 4.2 | 4.2 | 4.2 |
| D-3, in | 36 | 36 | 36 | 36 |
| L-1, in | 24 | 24 | 24 | 24 |
| L-2, in | 12 | 12 | 12 | 12 |
| L-3, in | 9 | 9 | 9 | 9 |
| F, in | 4.5 | 4.5 | 4.5 | 4.5 |
| A, ft | NA | 14.5 | 14.5 | 14.5 |
| Q, ft | 28 | 28 | 28 | 28 |
| Oil Inj Pt. | 32 | 32 | 32 | 32 |
| Tips # × Size, in | 9.036 | 9 × .036 | 9 × .036 | 9 × .036 |
| Feedstock Rate, gph | 136 | 136 | 136 | 136 |
| Feedstock Temp., F. | 350 | 350 | 350 | 350 |
| Feedstock Type | A | A | A | A |
| K+ Addition, gm/100 gal oil | 0.85 | 0.85 | 0.85 | 0.85 |
| Primary Comb. Air, kscfh | 50 | 50 | 50 | 50 |
| Primary Comb. Air Temp., F. | 750 | 750 | 750 | 750 |
| Primary Nat. Gas, kscfh | 2.06 | 2.06 | 2.06 | 2.06 |
| Air/Gas Burn Ratio | 9.7 | 9.7 | 9.7 | 9.7 |
| Downstream Air Rate, kscfh | 0 | 5 | 10 | 20 |
| Downstream Gas Rate, kscfh | 0 | 0 | 0 | 0 |
| Downstream Oxygen Rate, kscfh | 0 | 0 | 0 | 0 |
| Zone 2 Temperature Rise, F. | 0 | 110 | 224 | 482 |
| Zone 2 Residence Time, s | NA | 0.24 | 0.22 | 0.18 |
| Quench Temp, F. | 1350 | 1350 | 1350 | 1350 |
| Iodine Number, mg/g | 24 | 27.1 | 29 | 34 |
| CTAB, m$^2$/g | 28 | 29 | 29 | 30 |
| N2 Surface Area, m$^2$/g | 28.2 | 26.5 | 28.4 | 29.2 |
| I2/CTAB Ratio, mg/m$^2$ | 0.857 | 0.934 | 1.00 | 1.13 |
| Tint, % | 39 | 39 | 40 | 40 |
| DBPA, cc/100 g | 150 | 158 | 144 | 145 |
| DCBP, cc/100 g | 83 | 80 | 78 | 77 |
| CB LOADING, WT % | | | | |
| MELT FLOW INDEX | | | | |
| TAPE RESISTIVITY @ 90 C., OH-CM | | | | |
| CMA, % | | | | |
| NATURAL RUBBER 300% MODULUS, % from IRB-6 | 21.7 | 19.7 | 17.1 | 8.3 |

It should be clearly understood that the forms of the present invention herein described are illustrative only and are not intended to limit the scope of the invention. The present invention includes all modifications falling within the scope of the following claims.

We claim:

1. Carbon blacks characterized by having an Iodine Number of 54–58 mg/g; a CTAB of 41–47 m$^2$/g; an Iodine Number/CTAB ratio of 1.20–1.36 mg/m$^2$; a Tint of 49–57% and a CDBP of 84–88 cc/100 g.

2. The carbon black of claim 1 wherein the Iodine Number is 54 mg/g; the CTAB is 45 m$^2$/g; the Iodine Number/CTAB ratio is 1.20 mg/m$^2$; the Tint is 55%; and the CDBP is 88 cc/100 g.

3. The carbon black of claim 1 wherein the Iodine Number is 56 mg/g; the CTAB is 41 m$^2$/g; the Iodine Number/CTAB ratio is 1.36 mg/m$^2$; the Tint is 49%; and the CDBP is 84 cc/100 g.

4. The carbon black of claim 1 wherein the Iodine Number is 57 mg/g; the CTAB is 42 m$^2$/g; the Iodine Number/CTAB ratio is 1.35 mg/m$^2$; the Tint is 49%; and the CDBP is 84 cc/100 g.

5. The carbon black of claim 1 wherein the Iodine Number is 58 mg/g; the CTAB is 47 m$^2$/g; the Iodine Number/CTAB ratio is 1.23 mg/m$^2$; the Tint is 57%; and the CDBP is 86 cc/100 g.

6. A composition comprising rubber, a plastic or a mixture thereof, and a carbon black as defined in claim 1.

7. The composition of claim 6 wherein the Iodine Number of the carbon black is 54 mg/g; the CTAB of the carbon black is 45 m$^2$/g; the Iodine Number/CTAB ratio of the carbon black is 1.20 mg/m$^2$; the Tint of the carbon black is 55%; and the CDBP of the carbon black is 88 cc/100 g.

8. The composition of claim 6 wherein the Iodine Number of the carbon black is 56 mg/g; the CTAB of the carbon black is 41 m$^2$/g; the Iodine Number/CTAB ratio of the carbon black is 1.36 mg/m$^2$; the Tint of the carbon black is 49%; and the CDBP of the carbon black is 84 cc/100 g.

9. The composition of claim 6 wherein the Iodine Number of the carbon black is 57 mg/g; the CTAB of the carbon black is 42 m$^2$/g; the Iodine Number/CTAB ratio of the carbon black is 1.35 mg/m$^2$; the Tint of the carbon black is 49%; and the CDBP of the carbon black is 84 cc/100 g.

10. The composition of claim 6 wherein the Iodine Number of the carbon black is 58 mg/g; the CTAB of the carbon black is 47 m$^2$/g; the Iodine Number/CTAB ratio of the carbon black is 1.23 mg/m$^2$; the Tint of the carbon black is 57%; and the CDBP of the carbon black is 86 cc/100 g.

* * * * *